US007359068B2

(12) United States Patent
Yonescu

(10) Patent No.: US 7,359,068 B2
(45) Date of Patent: Apr. 15, 2008

(54) LASER TRIANGULATION METHOD FOR MEASUREMENT OF HIGHLY REFLECTIVE SOLDER BALLS

(75) Inventor: William Edward Yonescu, Palm Beach Gardens, FL (US)

(73) Assignee: RVSI Inspection LLC, Hauppauge, NY (US)

( * ) Notice: Subject to any disclaimer, the term of this patent is extended or adjusted under 35 U.S.C. 154(b) by 0 days.

(21) Appl. No.: 11/274,677

(22) Filed: Nov. 14, 2005

(65) Prior Publication Data

US 2006/0132801 A1    Jun. 22, 2006

Related U.S. Application Data

(60) Provisional application No. 60/627,581, filed on Nov. 12, 2004.

(51) Int. Cl.
*G01B 11/14* (2006.01)
*G01B 11/28* (2006.01)

(52) U.S. Cl. .............. 356/614; 356/602; 356/630
(58) Field of Classification Search .............. 356/614, 356/615, 620, 623, 630, 631, 634, 635, 639, 356/640; 250/559.24, 559.26, 559.27
See application file for complete search history.

(56) References Cited

U.S. PATENT DOCUMENTS

| | | | | | |
|---|---|---|---|---|---|
| 5,903,353 | A | * | 5/1999 | Raymond | ............ 356/620 |
| 5,999,266 | A | * | 12/1999 | Takahashi et al. | .......... 356/613 |
| 6,188,079 | B1 | | 2/2001 | Juvinall et al. | |
| 6,608,320 | B1 | * | 8/2003 | Skunes et al. | ......... 250/559.19 |

* cited by examiner

*Primary Examiner*—Roy M Punnoose
(74) *Attorney, Agent, or Firm*—Kenyon & Kenyon LLP

(57) ABSTRACT

A system and method of determining a height and/or position of at least one element on an area array device. A laser beam scans the area array device using at least two different laser light intensities. Reflected light is sampled, and the height and/or position of the element is determined using, e.g., optical triangulation.

52 Claims, 10 Drawing Sheets

LASER TRIANGULATION METHOD FOR MEASUREMENT OF HIGHLY REFLECTIVE SOLDER BALLS

CROSS REFERENCE

This application claims priority to U.S. Provisional Application No. 60/627,581 entitled A Laser Triangulation Method for Measurement of Highly Reflective Solder Balls, filed on Nov. 12, 2004, incorporated herein by reference in its entirety.

FIELD OF THE INVENTION

The present invention relates to a method for determining the position and height of solder balls on area array packages.

BACKGROUND INFORMATION

Recent design changes in fabrication of area array packages (e.g., Ball Grid Arrays (BGAs) and Chip Scale Packages (CSPs)) have resulted in a change in the reflectivity of the solder balls placed on these devices. In previous area array package designs, solder ball surfaces were relatively uneven and rough. When illuminated by a laser beam, for instance, the uneven and rough solder ball surfaces resulted in a strongly diffused and scattered incident light. More recent area array packages are characterized by solder balls that maintain a smooth and highly reflective surface.

Laser triangulation systems for the measurement of solder ball height and position on area array devices typically use a light emission source (e.g., a laser) and a receiver arrangement (e.g., a laser beam sensor). The laser projects a laser beam vertically down onto the surface of the area array device such that the surfaces of the solder balls are illuminated. Position sensing devices then record the position of the reflected light. The position sensing devices in the receiver arrangement of the sensor typically are arranged to operate at an angle between 20° to 30° from the normal plane of the solder ball, but may also operate in a range from 10° to 45°. When the solder ball surfaces are highly reflective, as in the case of new area array devices, the intensity of the reflected light in the receiver section varies over a very large range as the laser beam traverses across the surface of the solder ball.

When the laser beam reaches the apex (the highest elevation) of the solder ball, the solder ball surface is generally normal to the incoming laser beam. As a result of the positioning of the laser beam relative to the solder ball surface, as well as the reflectiveness of the solder ball surface, most of the laser beam light is reflected back towards the laser. The smooth surface of the solder ball results in minimal scattering of light toward the receiver arrangement. The receiver arrangement signal reception intensity and signal-to-noise ratio are low, resulting in very low signal quality. When the laser beam reaches a point on the solder ball surface where the ball surface normal is at approximately half the receiver angle, in most instances 10° to 15°, the laser beam is strongly specularly reflected directly into the receiver arrangement. This strong reflection results in a high amount of reflected laser beam light and a high signal intensity at the receiving arrangement. The large amount of reflected laser light often saturates the receiver arrangement and consequently the position sensing devices, resulting in poor overall signal quality at this location on the solder ball surface. Beyond this point, (i.e. progressing down the sides of the solder ball towards the bottom of the solder ball) most of the laser light is reflected more horizontally, and eventually towards the device floor, away from the receiver arrangement and corresponding position sensing devices. A single laser beam intensity may not be able to provide high quality receiver signals over the entire ball surface.

There is therefore a need to provide a method to accurately measure highly reflective solder balls placed upon area array packages.

U.S. Patent No. 4,991,968 describes conventional methods and apparatus for obtaining three dimensional object surface determination. As can be seen in FIG. 1 of U.S. Pat. No. 4,991,968, included as FIG. 1 of the present application, the prior art system 1 includes a projector assembly 3 with a projector 3A, variable power supply 3B, power controller 3C, video amplifer 8, processing unit 9, master timing control 29, and control circuitry 14. The method and apparatus disclosed in U.S. Pat. No. 4,991,968 have a significant drawback of being costly to produce due to the number of components used. Additionally, these conventional system are bulky to operate and do not adapt to chip scale packages used today. There is therefore an additional need to provide a method and apparatus for scanning the surface of an object that is not cumbersome to the user.

SUMMARY

It is therefore an objective of the present invention to provide a method to more accurately measure highly reflective solder balls placed upon area array packages. The objective of the present invention may be achieved as illustrated and described. The present invention relates to the determination of a height and/or position of a solder ball. In one example embodiment, a laser beam at a first laser beam intensity is directed at (and, thus, illuminates) a solder ball on an area array package. The area array package may be, e.g., a Ball Grid Array ("BGA") or a Chip Scale Package ("CSP"). Light reflected from the solder ball is sampled. A laser beam at a second laser beam intensity is also directed at (and, thus, illuminates) the solder ball. The resulting light reflected from the solder ball is also sampled. A position and/or height of the solder ball is then determined as a function of the sampled light reflected as a result of the laser beam at the first intensity, and the sampled light reflected as a result of the laser beam at the second intensity. For example, the height and/or position may be determined as a function of the sampled reflected light using an optical triangulation method. In one embodiment of the present invention, the first laser beam intensity may be under 1% of laser full power and the second laser intensity may be at approximately 100% of the laser full power.

In one embodiment of the present invention, the laser beam intensity may be changed from the first laser beam intensity to the second laser beam intensity by varying a drive current to the laser. The laser beam intensity may also be varied from the first laser beam intensity to the second laser beam intensity by an electro-optical arrangement, such as with a Kerr Cell or Pockels Cell or other electro-optical light-modulator. Such devices are typically driven by RF MOSFET devices. The laser intensity may also be varied from the first laser intensity to the second laser intensity by an acousto-optical arrangement or by various combinations of laser drive current and an acousto-optical arrangement and an electro-optical light modulator.

In accordance with an example embodiment of the present invention, the laser beam at the first laser beam intensity having low power may produce the best data when directed at the solder ball to a position other than an apex of the solder ball. Additionally, the laser beam at the second laser beam intensity having high power may produce the best data when directed at the solder ball at an apex of solder ball.

In an example embodiment of the present invention, the laser beam intensity may be varied by varying an RF drive power to an acoustic-optic deflector (A-O deflector).

The light reflected from the laser beam may be sampled via a receiving section.

In accordance with another example embodiment of the present invention, a laser beam at a first laser beam intensity is directed at a solder ball on an area array package (e.g., a BGA or a CSP) for a first period (e.g., 0.1 to 0.9 of an entire sample period). The light reflected from the solder ball as a result thereof is sampled. For a second period (e.g., 0.9 to 0.1 of the entire sample period), the laser beam intensity is varied to a second laser beam intensity, while the laser beam is directed at the solder ball. The light reflected from the solder ball resulting from the laser beam at the second laser beam intensity is also sampled. The height and/or position of the solder ball is then determined as a function of the sampled light reflected as a result of the laser beam at the first laser beam intensity, and the light reflected as a result of the laser beam at the second laser beam intensity. The height and/or position of the solder ball may be determined, for example, using an optical triangulation technique. The reflected light captured by the receivers may be sampled by electronics following the receivers during a small fraction of the first and second period or integrated over most of each period to capture a maximum amount of reflected energy and thereby maximize the signal to noise ratio. In this embodiment a position sensing detector (PSD) having output currents whose ratio is a function of the position of a light spot on its surface may be used as a detector in each receiver.

In this example embodiment, the first laser beam intensity may be under 1% of full laser power, and the second laser beam intensity may be approximately 100% of full laser power. The laser beam intensity may be changed from the first laser beam intensity to the second laser beam intensity by varying a drive current to the laser. The laser beam intensity may also be changed from the first laser beam intensity to the second laser beam intensity by an electro-optical arrangement and/or an acousto-optical arrangement. In one embodiment of the present invention, the height and/or position of the solder ball may be determined based upon the sample(s) having the best signal to noise ratio.

In accordance with yet another embodiment of the present invention, the laser beam intensity of a laser scanning a solder ball is alternately varied between at least two intensity levels to produce high and low intensity deflected lines. In this example embodiment, the deflected lines are sampled and are used to determine the height and/or position of the solder ball (using, e.g., optical triangulation). The high intensity lines may be produced, e.g., using 100% laser power, while the low intensity lines may be produced, e.g., using 1% laser power. The high intensity lines may be spaced, e.g., every 38 microns. The low intensity lines may also be spaced, e.g., every 38 microns, but may fall halfway between or 19 microns from the preceding and following high intensity lines. These "interlaced" high and low intensity lines may be used with a projected laser line and a CCD or CMOS detector used in each receiver; each detector consisting of an array of pixels.

In all of the methods previously described, the laser may be, e.g., a semiconductor diode laser.

DETAILED DESCRIPTION OF EXAMPLE EMBODIMENTS

Figure 1:
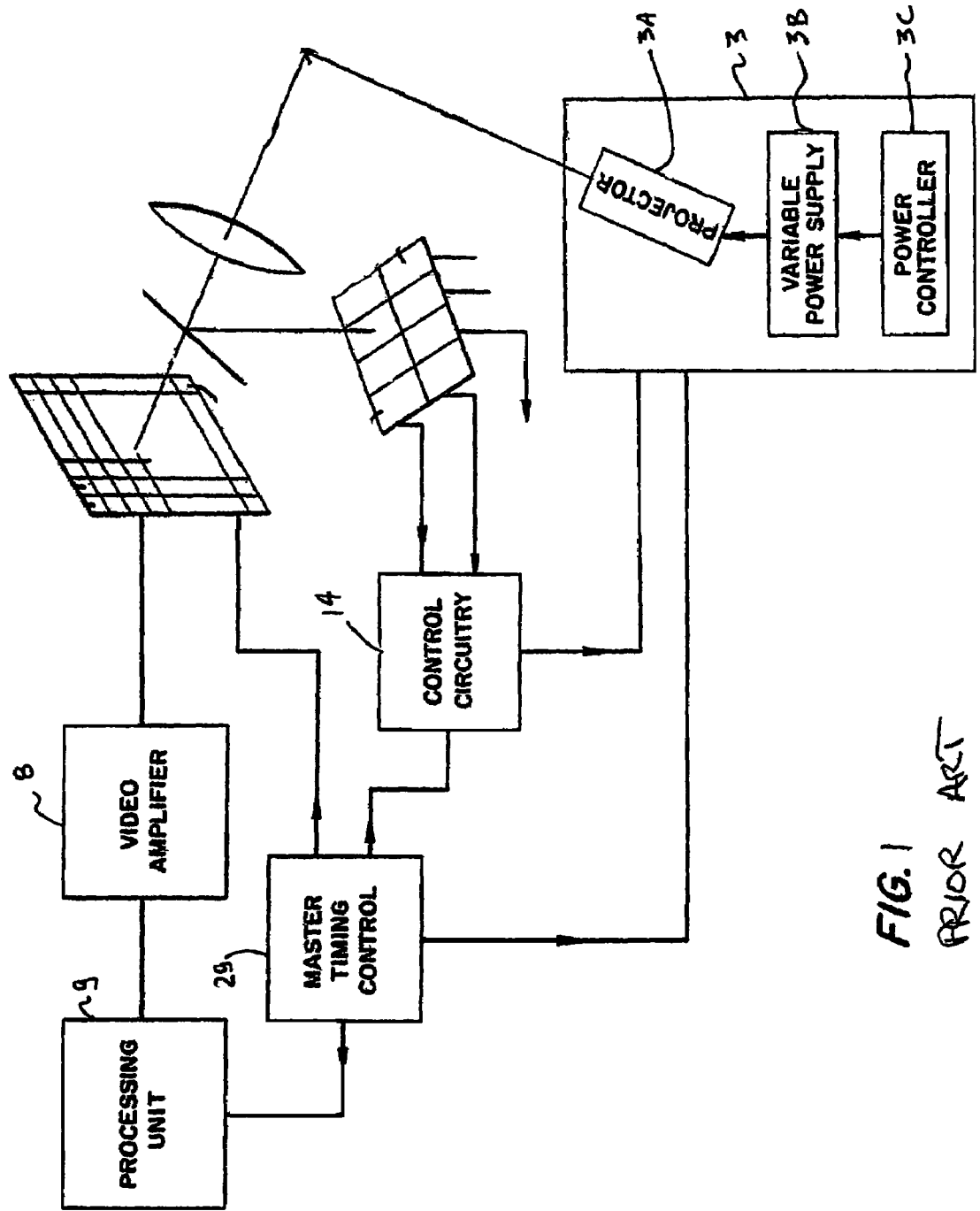
FIG. 1 is a conventional system used for obtaining a three dimensional determination of the surface of an object.
Figure 2:
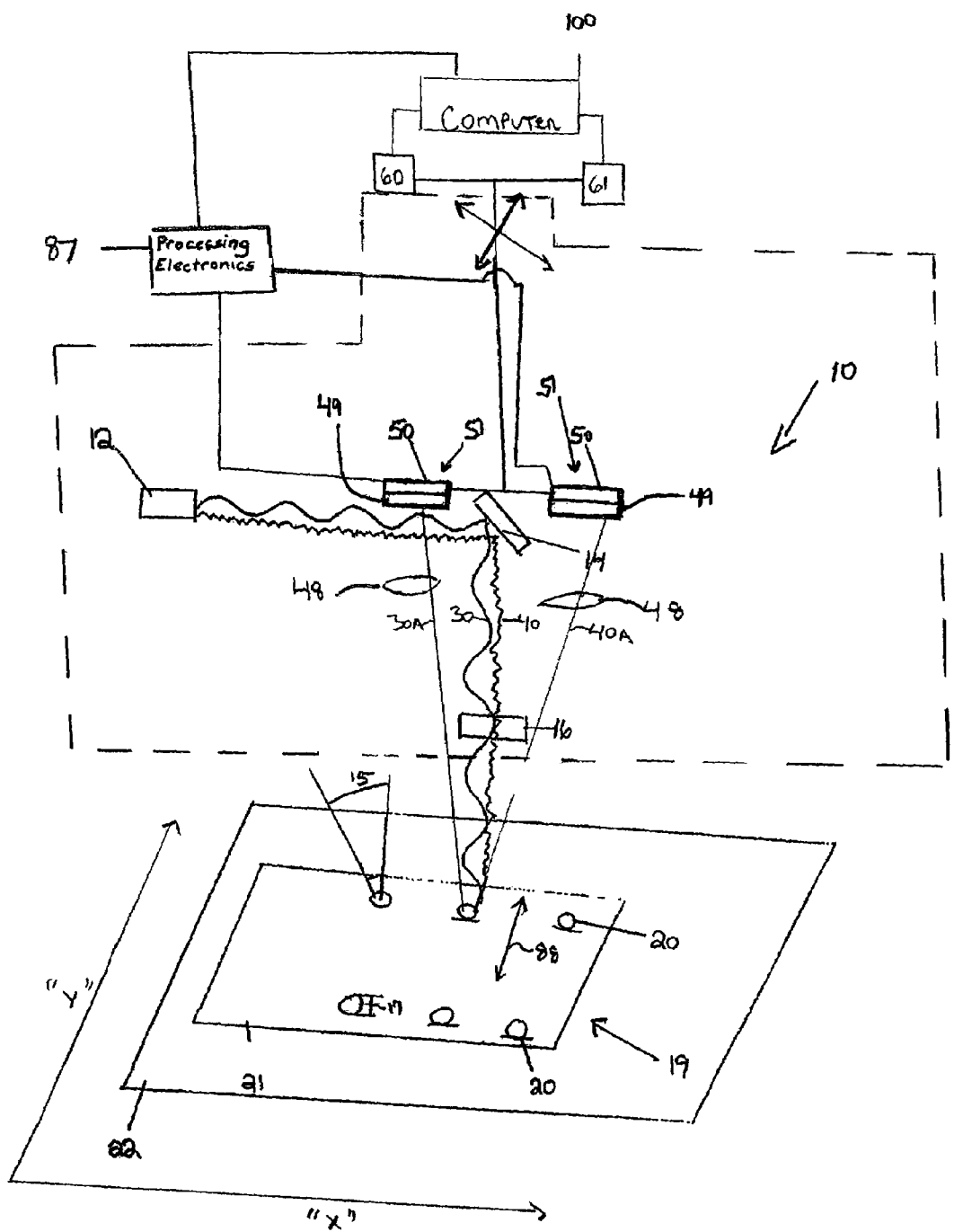
FIG. 2 is an example system in accordance with the present invention.

Referring to FIG. 2, the present invention may improve the measurement quality of laser triangulation systems 10 used to measure highly reflective solder balls 20. The present invention may allow solder balls placed upon electrical components for example to be measured with a high precision as a function of reflective light from a laser beam directed at the solder ball surface. In an embodiment of the present invention, the reflected signal 30A of a high intensity laser beam 30 is used for points on the top and sides of the solder ball 20 (where the scattered signal to the receivers is low), and the reflected signal 40A from a low intensity laser beam 40 is used for the specular regions 15 of the solder ball 20 (where the reflected signal is high). By collecting data points of high quality (high signal-to-noise ratio and no saturation) from all sections of the ball surface—from the top and sides of the solder ball and the specular regions 15 of the solder ball 20, measurement quality (repeatability and accuracy) may be improved.

Inspection at the "high" and "low" laser beam intensities may be performed at each sample point on the ball surface by several methods, which will be described below.

A laser beam triangulation system 10 is used for obtaining three dimensional measurements of ball height 17 and to ensure that balls on the area array device (BGA and CSP) are coplaner 19 to each other. In an exemplary embodiment of the present invention, the laser beam triangulation system 10 translates both a sensor arrangement 51 and a laser beam 30, 40 over a tray 22 containing multiple area array packages 21, each including a number of solder balls 20.

In the sensor arrangement 51 (shown schematically), the laser beam 30, 40 from a pulsed semiconductor diode laser 12 passes through, e.g., a 500 spot acoustic-optic deflector 14 and then through imaging optics 16. The focused deflected laser beam 30, 40 forms, e.g., a line of 25 micron diameter spots, 12.5 mm long which is projected at approximately normal incidence onto the device (i.e., the solder balls of the device) to be measured. The laser beam is deflected to an exemplary direction parallel to the "Y" axis. At least one solder ball 20 is contained on the device 22 to be measured.

Alternatively, the beam 30, 40 from the semiconductor diode laser 12 (running continuously) can be formed into a line, e.g., 10 mm to 20 mm long and approximately 25 microns wide, on the device surface. The laser beam 30, 40 may also traverse along an axis, shown as an exemplary "Y" parallel axis 88, to illuminate objects placed on the area array device. In another configuration, acousto-optic deflector 14 may be replaced by a conventional cylindrical lens or an equivalent holographic lens that spreads the beam to form a line.

The receiver section 50 of the sensor arrangement 51 may include two identical sections of receiving optics 48 and detectors 49. The two sections of receiving optics 48 and detectors 49 may be angled symmetrically about the normally incident laser at a 20° to 30° angle to collect data to be used for triangulation. (Use of two detectors may be used, e.g., in situations where one sensor view may be obstructed and also for data confirmation of received data from the other detector). The receiving optics 48 focus the reflected laser beam light from the solder ball surfaces onto the detectors 49. By determining the relative position of the imaged spot on a detector 49, the "Z" position of the laser spot on the solder ball surface is calculated by triangulation. The "X" position of the laser beam (or laser line) is determined by the sensor head 50 "X" position which typically is accurately known from the position encoders 60 on the "X" axis along which the sensor 50 is driven. The "Y" location of the deflected laser spot is determined by the sensor head 50 location as determined by the "Y" encoder 61 summed with information from the circuit driving the beam deflector which may be an acousto-optic deflector or a galvanometer driven mirror or a rotating polygon device. When the highest accuracy is needed the laser beam position may be sampled at the output of the deflector as is common practice in scanning devices. The encoders 60 and 61 track position of the sensor head as the sensor head, illustrated as enclosed in the dotted line, traverses along a scanning path. The sensor head may move along any plane, as indicated, in FIG. 2.

When a line of deflected spots is used, the detectors 49 are so-called position sensing detectors (PSD's) which provide an output current ratio which is proportional to the position of the focused light spot falling along the PSD's length. This establishes the "Z" height of the spot illuminated by the laser beam. When a laser line is projected, the "Y" position of a point on the laser line is obtained from the sensor head 50 "Y" position and the location of the point's image on the pixels on the CCD or CMOS camera that correspond to the "Y" axis in the receiver's image. In the case of a projected laser line the "Z" height of each of the individual points illuminated by the laser line is determined by the position of the image of the individual points on the CCD or CMOS camera in the direction corresponding to the "Z" (depth) dimension of the camera. Processing electronics 87 may also be included in an exemplary embodiment, wherein the electronics can receive output from components, such as a CCD camera device or a PSD and convert the output into a digital format suitable for use with a computer 100

When a continuous line is projected on the ball surface, the detectors 49 in the sensor 50 may be, e.g., CCD or CMOS cameras. Here, the position of the individual points on the focused line on the camera surface determines the "Z" position of the surface points being illuminated.

Regardless of the type of detector 49 in the three dimensional sensor 50, low intensity signals from the top and sides of highly reflecting solder balls 20 may yield poor quality data. Additionally, high intensity signals from the specular region of the balls may saturate the PSD's, cameras, and/or of the following electronics.

Figure 3:
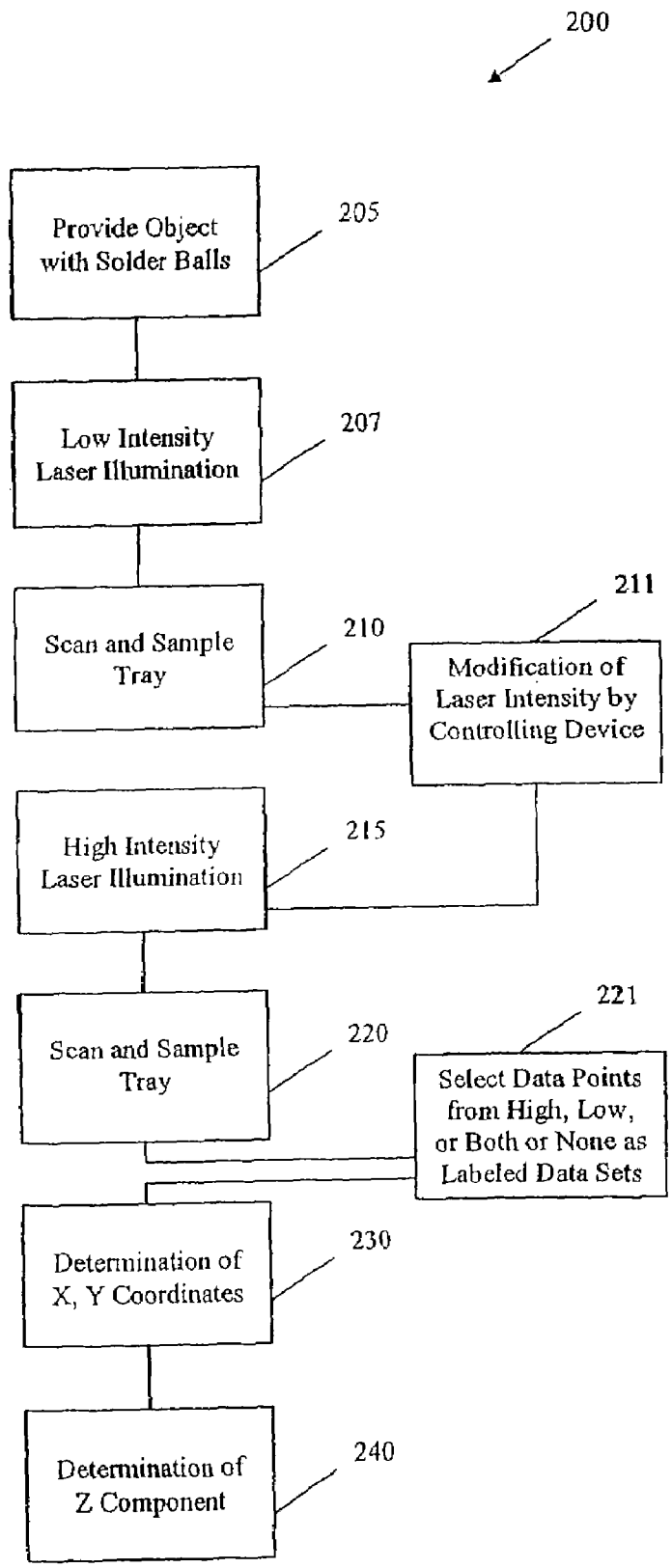
FIG. 3 is a flowchart for an exemplary method according to the present invention.

In the first exemplary embodiment of a method 200 of the present invention, according to FIG. 3, the solder balls on the devices under test 205 (area array devices) are illuminated by a laser beam at lower intensity 207. The light reflected by the solder balls as a result thereof is sampled 210 (resulting in a data set labeled "low"). The laser intensity is modified by a controlling device 211. The solder balls are then illuminated by a laser beam at a higher (e.g., "high") intensity 215. The light reflected by the solder balls as a result thereof are also sampled 220 (resulting in a data set labeled "high") 221. In one example embodiment, the "high" laser intensity is full, 100% laser power while "low" intensity may be 1% or less of full power to prevent saturation. Although the "high" and "low" laser intensity is provided as typically full, 100% laser power and less than 1% full power laser intensity, other values may be used such that the "high" values are higher in laser intensity than "low" laser intensity levels.

Laser intensity may be varied by altering the drive current to the semiconductor diode laser and/or the RF drive power to the A-O deflector 14. Optical modulation of the laser intensity by electro-optic or acousto-optic techniques may also be used. As a non-limiting example of the A-O defector 14, the deflector 14 may permit a maximum angle of variation of the laser beam as well as provide a defined resolution (i.e., a number of specific directions in which the deflector may operate). The A-O deflector 14 may have an optical transmission capability of at least 50% and provide correction for a small variations in laser wavelength.

Electro-optical modulation systems may use RF MOSFET technology to drive the electro-optical elements to achieve the desired results. The electro-optical modulation systems may provide for a high bandwidth capability, and fast rise and fall times. Transmission ratios may be greater than 85% for efficiency of modulation.

In the first embodiment of the present invention, total data acquisition time is doubled, as compared to a single scan process, as a result of the two complete scans that are performed for an entire tray of devices; one scan for each intensity level. The data sets obtained from the "high" and "low" scans may then be combined by choosing a sample from either the "high" or "low" data set at each sample point according to their relative intensities and signal to noise ratios. In the example embodiment, the point from the data set that has the highest non-saturated intensity value is chosen. A final data set then results from the data chosen. The "X" and "Y" values may be obtained from the sensors and may then be used directly for the determination of "X" and "Y" components of the solder ball. Triangulation 240 such as optical triangulation may also be used to determine the "Z" (vertical component) of height of the solder ball while position encoder readings of the samplings 230 may be used for the "X" and "Y" components.

It should be noted that although the flowchart of FIG. 3 shows scanning using the "low" intensity laser beam first and the "high" intensity laser beam second, it is of course possible to scan with the "high" intensity laser beam first and the "low" intensity laser beam second. Additionally, although illustrated and described as having the laser 12 and/or the A/O deflector 14 and receiving arrangement 51 moving, other configurations are possible, including providing a controlling device which controls indexing and movement of the trays upon which the solder balls are placed or the movement of the laser 12 or both. Furthermore, the controlling device can be linked to the laser to vary the output of the laser 12, thereby allowing a variation of laser beam intensity levels. The process may be repeated over the entire surface of the solder ball, thereby producing data about the entire positional relationship of the solder ball.

Figure 4:
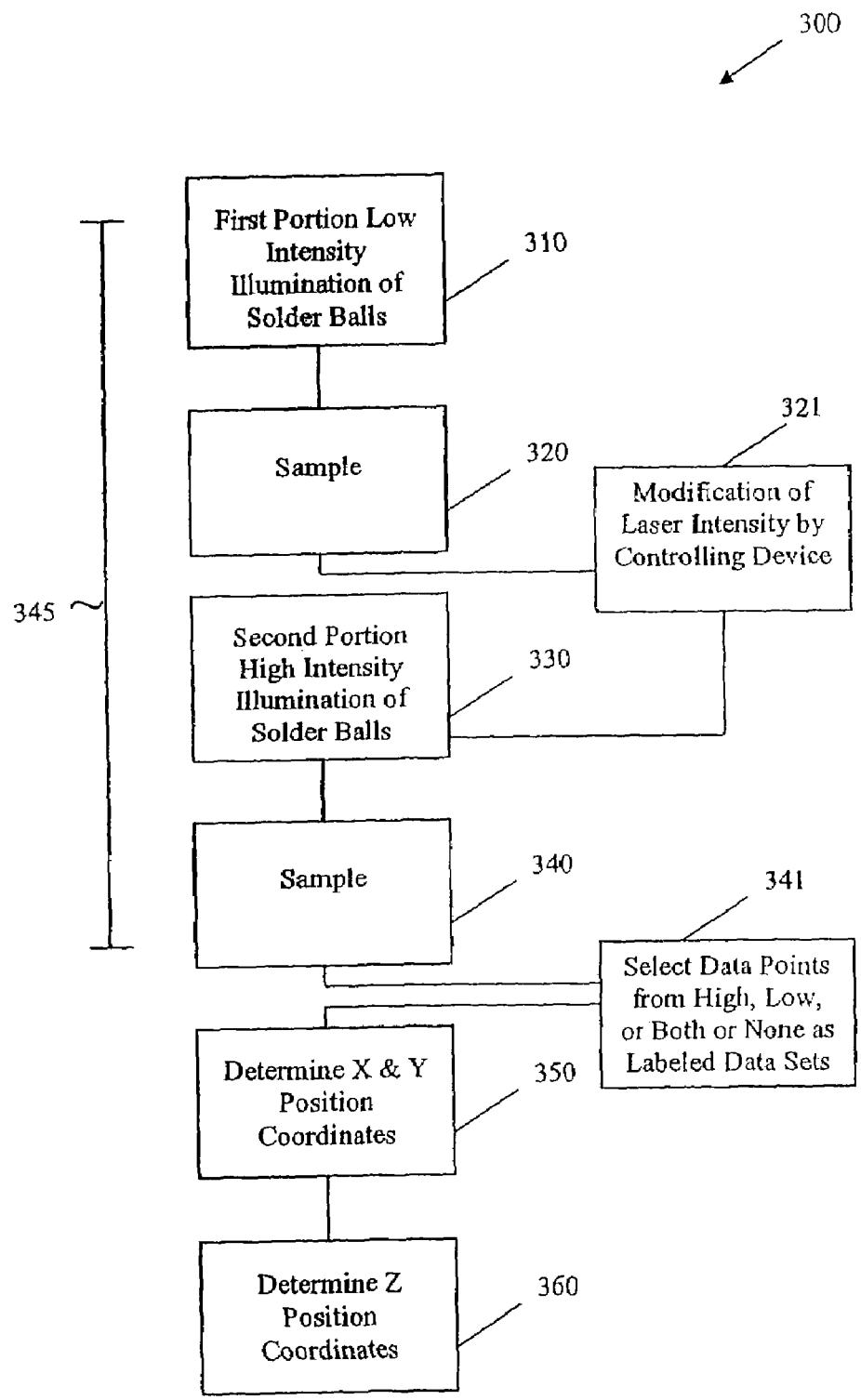
FIG. 4 is a flowchart for a second exemplary method according to the present invention.

Referring to FIG. 4, in a second exemplary method 300 according to the present invention, a fraction of the normal "laser on" time, e.g., a first period, is used provide a laser beam at a lower laser beam intensity at the solder balls 310 and to gather data from the resulting reflected laser beams 320. The laser 12 may be operated at a reduced drive current to generate the lower laser beam intensity. The laser intensity is modified by a controlling device 321. In the remaining fraction of the entire sample period, e.g., a second period, the laser 12 is operated at high laser beam power 330 creating a high laser beam intensity. The reflected laser light is then gathered from the high laser beam power 340. The second exemplary method according to the present invention may be used for spot scanning (i.e. single point scans) on the surface of the highly reflective solder balls as each point on the reflective solder ball is illuminated by two different intensity laser beams and the corresponding reflected light sampled. The initial fraction of the "laser on" time, the first period, for low intensity may be set, e.g., anywhere between $\frac{1}{10}$ and $\frac{9}{10}$ of the entire sample period 345. The "high" and "low" intensities may be, e.g., 100% and approximately 1% of full laser power respectively, although other values may be used. Additionally, other fractions of "laser on" time may be used and the described embodiment is merely illustrative of the potential periods to be used. Electro-optic or acousto-optic modulation techniques may also be used to vary the overall laser beam intensity. When using the second exemplary method, the position values corresponding to both the "low" and "high" laser beam power intensity scans are immediately available for use for each position on the reflective solder ball. Either of the "low" and "high" laser-beam power intensity scans may be used 341 for position coordinates 350 or both may be stored for use. Additionally, the data used may be a blended data set wherein the blended data set is derived by choosing data having the best signal to noise. The blended set may be derived through the use of computer software that selects the best representable non-saturated detected values obtained from "high" and "low" laser beam intensity reflections. The data may be stored in a memory, for example a computer hard disk, for retrieval. Triangulation 360 may also be used to determine the height of the solder ball surfaces, similar to the first exemplary embodiment. The process may be repeated over the entire surface of the solder ball, thereby producing data about the entire positional relationship of the solder ball.

Additionally, for some semiconductor devices, the laser beam intensity of the first period can be either provided at a "low" or "high" intensity level, while the laser beam intensity of the second period is provided at the opposite of the laser beam intensity of the first period. For semiconductor devices that require a recovery period after saturation it is preferable to provide the low intensity beam first and the high intensity second with an additional recovery period during which the laser is off following the period of the high intensity laser transmission.

In accordance with this example embodiment of the present invention, a total data acquisition time may be equal to the time used with a standard single pass inspection using a single laser beam intensity. This example embodiment thus can be quicker than a dual scanning technique. In the first exemplary embodiment, a controlling device may be used to position either the individual solder balls (by controlling tray indexing) or position the laser 12 and/or A-O deflector 14 and receiving arrangements 51 as well as the laser beam intensity. The controlling device may also control laser beam modulation through controlling software. The controlling device may be, for example, a computer, a microprocessor, an application specific computing device or other computing device as illustrative examples.

Figure 5:
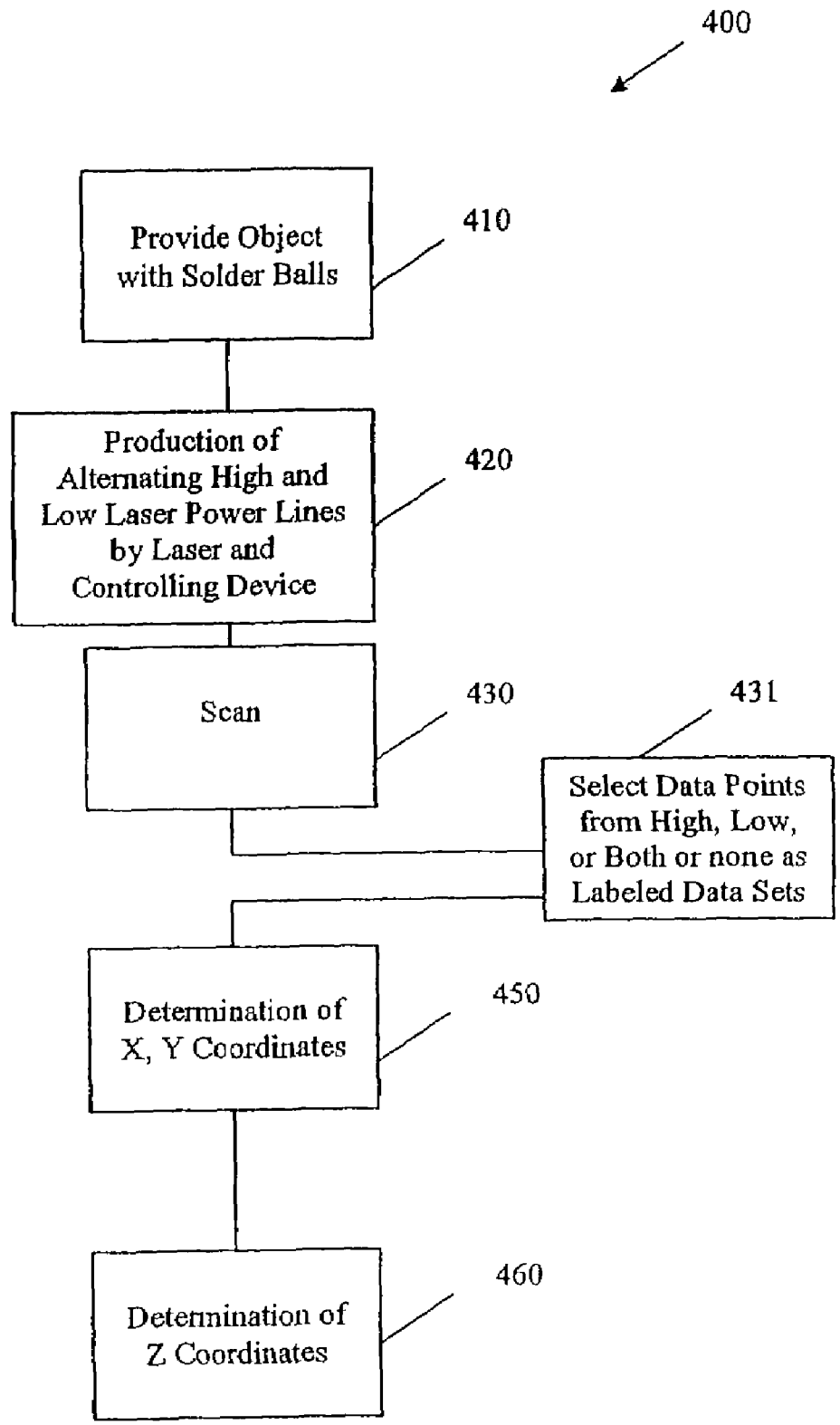
FIG. 5 is a flowchart for a third exemplary method according to the present invention.

FIG. 5 shows a third exemplary method 400 for determining the height and/or position of at least one solder ball positioned on an area array device, such as a BGA or CSP. As in the previously described exemplary methods, highly reflective solder balls are provided on an area array package 410. In the third exemplary method, the number of acousto-optically deflected lines produced may be doubled compared to the first two exemplary methods described. Variation of the laser current and/or RF drive power to the A-O deflector 14 or other optical modulation techniques may be used to produce both high power and low power laser lines provided to the A-O deflector 420. Alternatively, other optical modulation techniques may be used to produce the typical "high" laser beam intensity and "low" laser beam intensity lines. In an exemplary embodiment, the "high" intensity lines may be 100% of full laser power and the "low" intensity lines may be at less than 1% of full laser power. As will be understood, other laser beam intensity power levels may be used.

In this example embodiment, the "low" intensity deflected lines fall between the normally spaced high intensity lines comparable to interlacing on a television screen. For example, if the "high" intensity lines are spaced every 38 microns, then the "low" intensity lines will also be spaced every 38 microns from each other, but fall halfway between or 19 microns from the preceding and following "high" intensity lines. Scanning may then proceed wherein the "high" intensity laser beam lines and the "low" intensity laser beam lines progress over the surfaces of the solder ball surfaces 430. Data points are developed over the entire solder ball surface of both "high" and "low" power scans. In this exemplary embodiment receiver section 50 then detects the reflected laser light from the surface of the solder balls 20. As with the previously described exemplary methods, the receiver arrangements 51 can store either or both of the high or low reflected laser beam light data sets for storage. The positional information obtained from the scanning and the position encoders 60 and 61 can be used directly 450 or selected data points can be used from either or both of the high and low laser intensity scans. As a result, a blended data set may be created as a result of the data points generated. The blended data set is obtained from controlling software which compares the data sets of the "high" and "low" data sets and can select either or none 431. The method can use the highest quality signal to noise ratio data points of either set, as an example, to provide for the "X" and "Y" coordinate values of the solder balls 20. Through optical triangulation, the "Z" or height calculation for the surface of the solder ball 20 may also be calculated 460. All of the data from the position encoders 60 and the receiver arrangements 51 can be stored and processed on a computer 100. The computer 100 may be used as the controlling device to control laser modulation, tray indexing and laser movement and receiver section 50. The controlling device may also be a microprocessor or an application specific integrated circuit.

Finally, the "interlaced" high and low intensity lines can also be used with a continuously projected laser line formed with the use of a conventional cylindrical or equivalent holographic lens and CCD/CMOS detectors. Here, the intensity is varied from high to low for alternating lines by for example, changing the laser drive current. Other optical modulation techniques may also be used. The process in the third exemplary embodiment may be repeated over the entire surface of the solder ball, thereby producing data about the entire positional relationship of the solder ball.

In all of the exemplary methods described above, the "low" received signals and the "high" received signals for each sample point on the ball surface may be analyzed by a simple processing algorithm which may, e.g., select and report out the best quality signals (unsaturated signal with best signal-to-noise ratio) for the "X" and "Y" positions. The highest amplitude non-saturated signal will usually have the best signal to noise ratio. The best "X" and "Y" positions may then be used to determine the "Z" measurement from triangulation. Subsequent analysis of these best data points on the ball surface may yield more accurate and repeatable values for the desired measurements of ball height and ball coplanarity.

Additionally, the control of the laser and the translation system may be implemented in, e.g., software, circuitry and/or a combination of both.

While the above description has been written as relating to a three dimensional laser system 10 using a single normally incident laser 12, other systems may be used. As an example, the same considerations using "high" and "low" intensity signals from different parts of the ball surface may be used if the three dimensional system uses a position sensing detector or camera that views the device surface normally and an off-axis laser beam or beams accomplish triangulation. Additionally, the methods according to the present invention provide methods for measuring reflective surfaces, therefore the methods provided are not limited to measuring solder ball surfaces, but rather all reflective surfaces may be measured. The systems used to determine the positions may also use multiple lasers to produce the "high" and "low" data points.

The example embodiments described above are presented in the context of varying the laser intensity of a single laser system. Of course, it is possible to utilize more than one laser (e.g., of different laser intensities).

Figure 6:
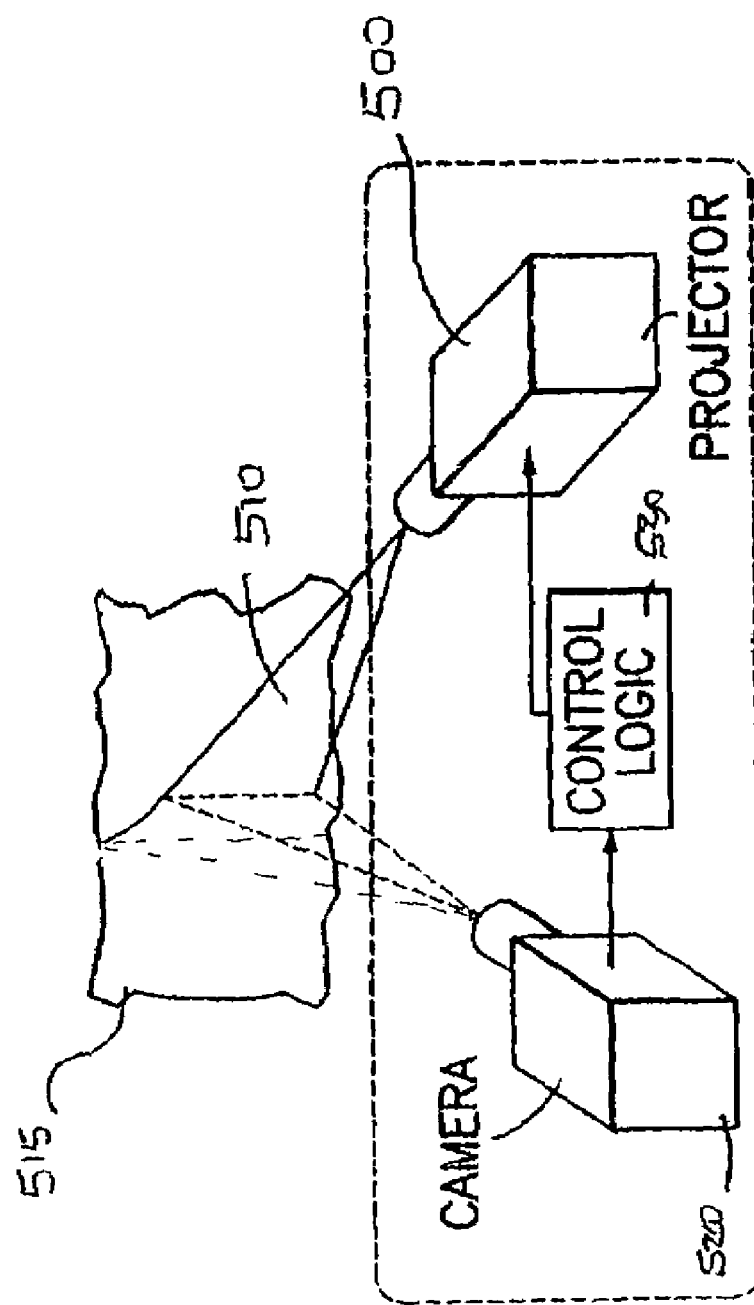
FIG. 6 is a perspective view of a laser projector, incident surface and camera arrangement.

As provided in FIG. 6, a perspective view of the relationship between the laser, the target objective, and the receiving arrangement (camera) is illustrated. A laser (projector) 500 may used to provide a light plane 510 to a surface 515 of a solder ball, wherein the surface 515 consequently reflects the incident light. The reflected light is detected by a receiving arrangement, in this exemplary embodiment a camera 520. The projector 500 may be positioned at an angle away from the camera 520, as illustrated, or may be located within the same plane. Moreover, as described above, the laser beam may be reflected onto the surface 515 of the solder ball, through the use, for example, of an A-O defector or other arrangement. In this way, the projector 500 illuminates the target, in this exemplary case the solder ball, for reading by a camera or a receiving arrangement 51.

Figure 7:
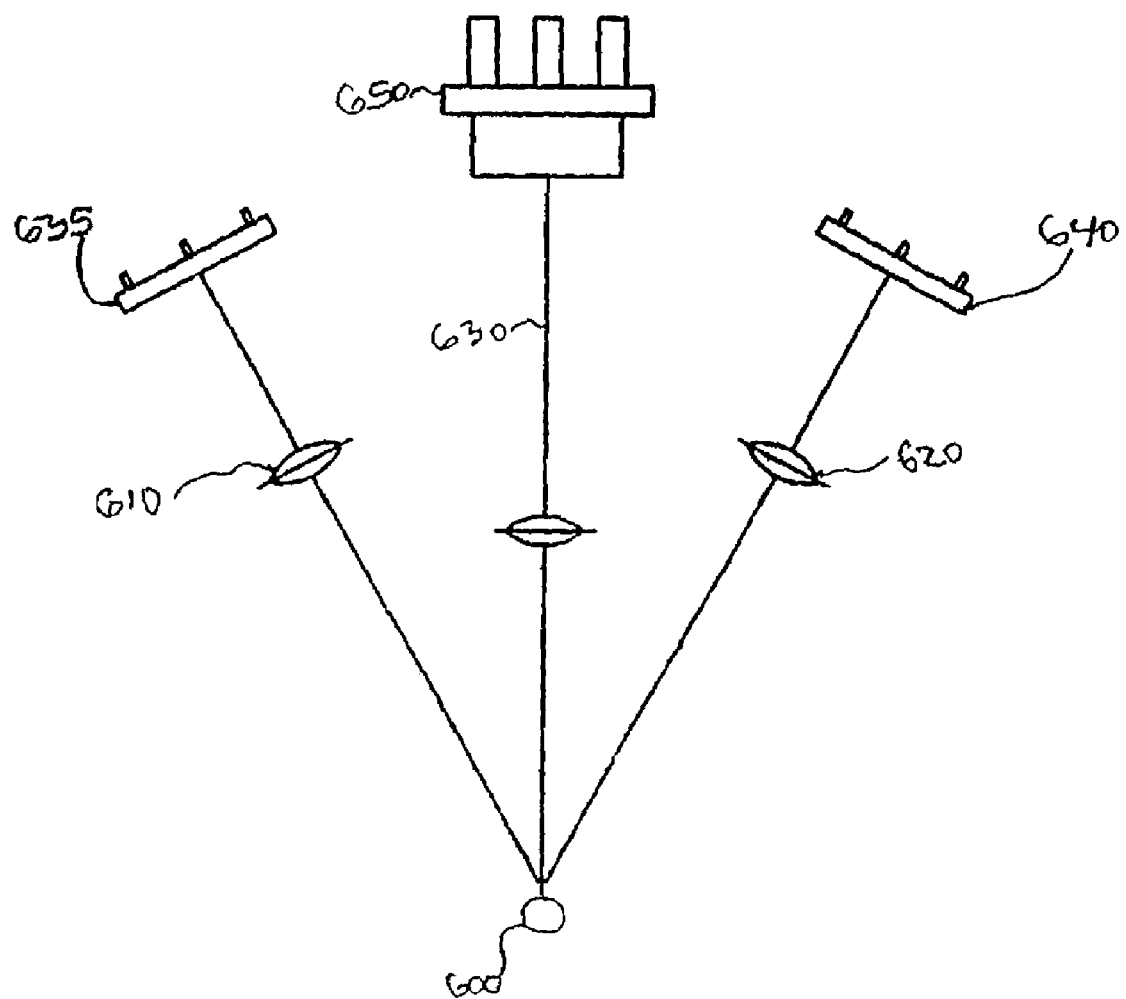
FIG. 7 is a side view of an incident laser beam reflecting off of a surface of an incident target and received by multiple position sensing devices.

In another exemplary embodiment of the present invention, FIG. 7 provides multiple channels, including a central channel 630, that can be coaxial with the laser beam, that can be used to avoid shadowing and obtain an overhead image of the solder ball 600 during scanning. The laser beam may be bounced off of the surface of the solder ball 600 and focused through two side optical systems 610 and 620 onto a receiving arrangement, such as position sensing devices 635, 640. The central channel 630 may be used in conjunction with a position sensing device 650 as well. In this configuration, the shadow effects off of the top of the solder ball 600 are minimized and an overhead image is obtained.

Although shown as having two side channels and a single central channel, other configurations may be used to minimize shadow effects, including, but not limited to, multiple channels side configurations. The use of multiple channels may be used in all embodiments of the present invention to reduce potential shadowing effects.

Figure 8:
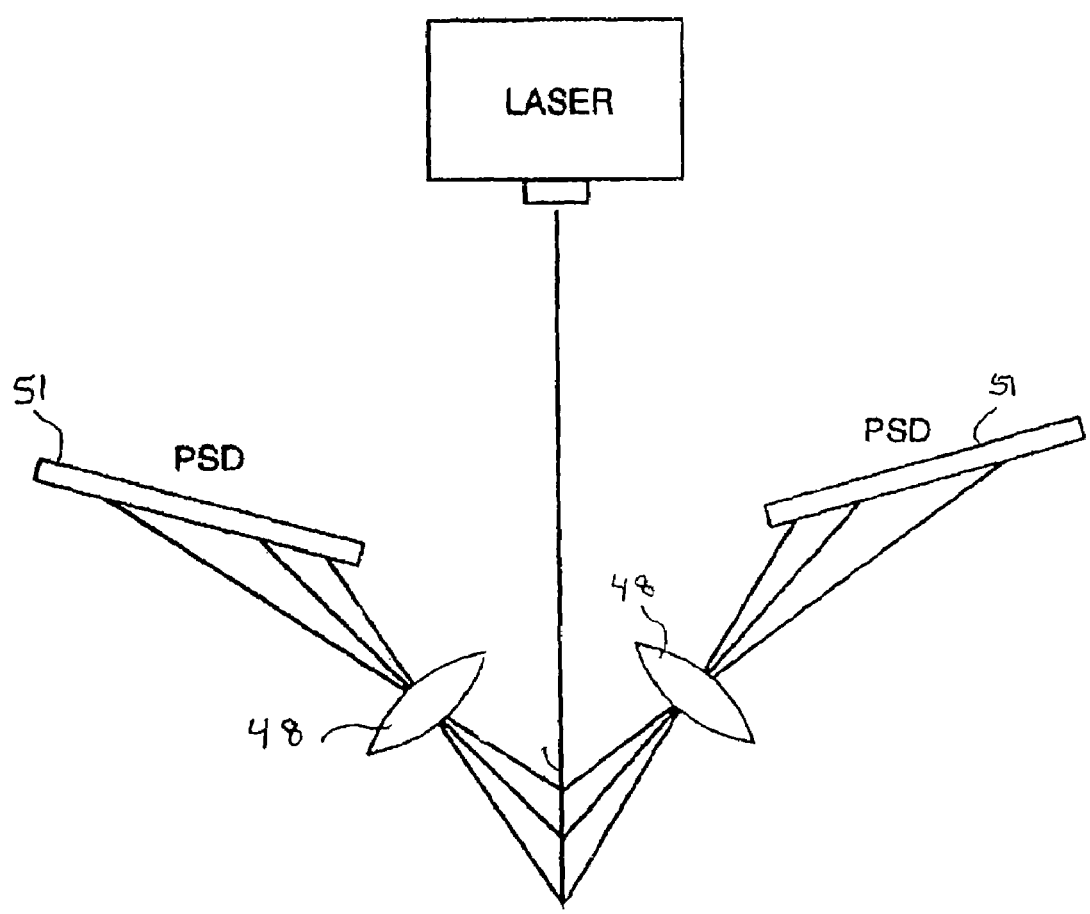
FIG. 8 is a side view of an incident laser beam being focused by receiving optics and position sensing devices.

FIG. 8 illustrates an exemplary embodiment of the present invention, in an exemplary vertical plane wherein the position sensing devices (or CCD/CMOS camera) are focused on the laser beam or light plane. By focusing the position sensing devices (receiving arrangements 51) on the light plane, the image obtained is sharp and may be used for determination of position. The receiving arrangements 51 are controlled through the use of a computer, for example, to maintain optimal focus. Additionally, focusing optical arrangements 48 may be controlled to focus the reflected light onto the position sensing devices (receiving arrangements 51).

Figure 9:
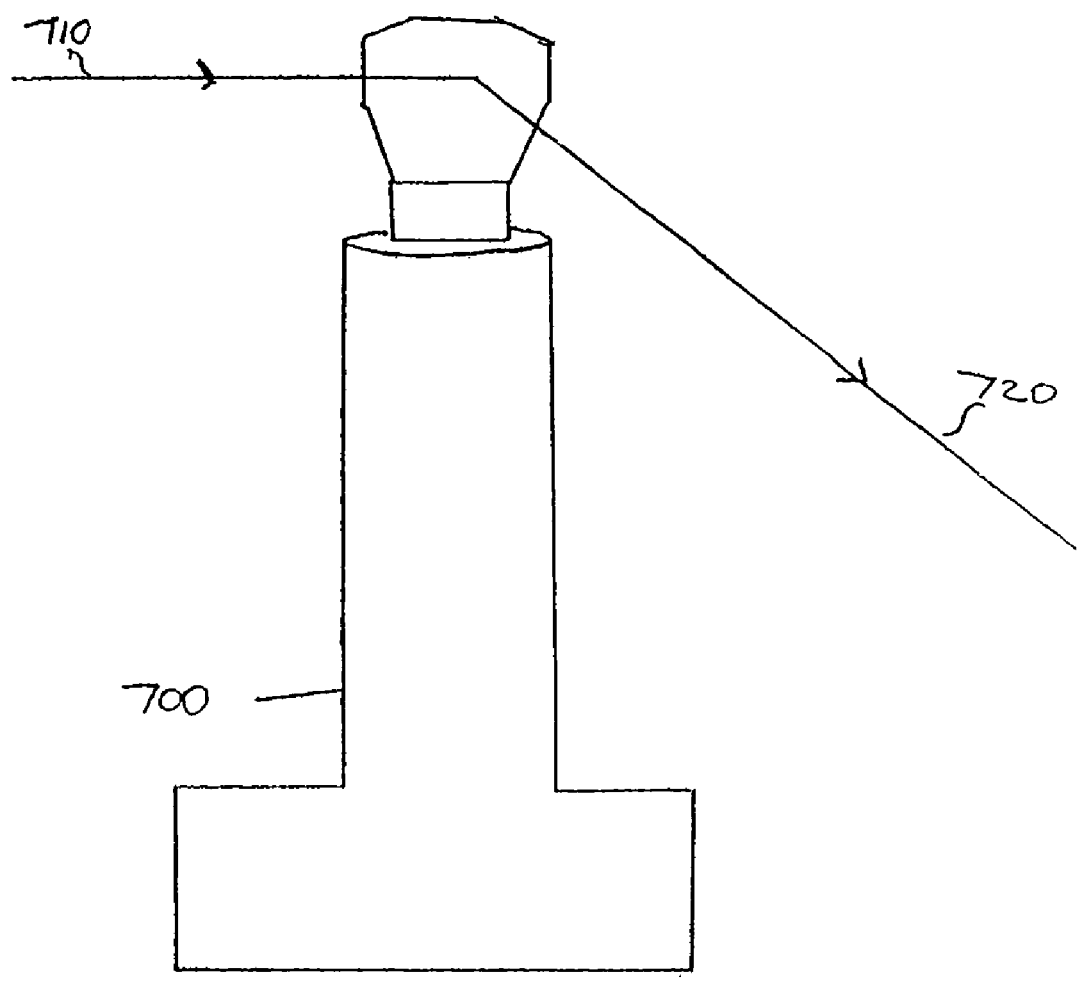
FIG. 9 is a side view of a galvanometer reflecting incident light from a laser beam.
Figure 10:
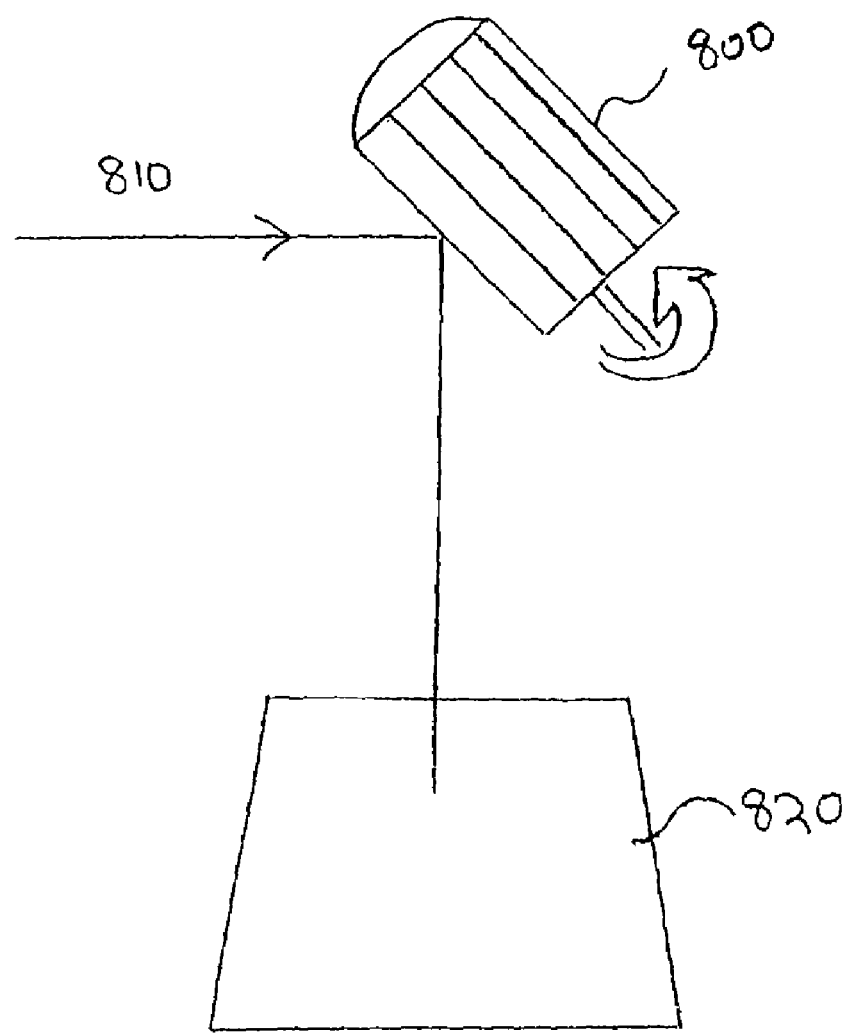
FIG. 10 is a side view of a rotating polygon sweeping a laser line over a prescribed field.

FIG. 9 illustrates a galvanometer 700 which accept laser light 710 generated from the laser beam, and focuses/changes the direction of the laser beam toward the object 720 to be illuminated. Additionally, as presented in FIG. 10, a rotating polygon 800 may accept laser light 810 generated from the laser beam, reflect the incoming light and sweep the reflected laser light across a defined field 820 of illumination thereby providing sufficient coverage for an area, such as the area array package. Although illustrated as reflecting laser light by the use of a galvanometer 700 or a rotating polygon 800, other methods and techniques for reflecting laser light may be used and the illustrated embodiments are merely exemplary.

The present invention may allow more accurate measurement of highly reflective solder ball surfaces which may be on process trays and electrical equipment, such as microprocessors undergoing manufacturing. The variation of the high and low laser beam intensity light source by a controlling device allows for accurate positional reading of the solder balls, such as "X", "Y" and "Z" components of the surface of the solder ball, hereto for unknown. The method may be accomplished by modifying existing apparatus, thereby allowing manufacturers to accomplish accurate measurements of solder ball surfaces without expending significant financial sums for additional equipment. The present invention furthermore is compliant with newer area array designs, therefore the method may be used for a great number of existing equipment types from different manufacturers. The present invention may minimize potential short circuiting of produced components from inaccurate placement of solder ball components. Additionally, the present invention may provides more accurate measurement and/or placement of solder ball components before solder melt thereby minimizing thermal strain, and alleviating fatigue failure of components. The example embodiments can be used with any solder sphere structures, for example, 90% lead/10% tin structures as well as other eutectic solder fillet structures. The solder ball spacing may be any spacing between components, such as 0.80 mm, 1.00 mm and 1.27 mm as non-limiting examples. The accuracy of the measurement of the present invention allows for a tight spacing of components incorporating the solder balls due to the high accuracy capabilities of the system. The present invention provides accuracy of measurement such that tolerance of ±5 µm can be achieved. The present inventive method may also achieve higher measurement accuracy if needed by using higher accuracy laser development equipment and receiving arrangements. An additional advantage of the present invention is the use of a low power laser which prevents solder ball reflow from occurring as a result of high heat buildup in the solder ball. The methods according to the present invention, therefore, have an advantage of being able to operate on small size solder balls as the power levels used can be diminished, while still providing accurate measurements.

What is claimed is:

1. A method of determining a height and/or position of at least one element on an area array device, comprising:
   directing a laser beam having a first laser beam intensity at the surface of the at least one element;
   sampling light reflected from the at least one element, the reflected light resulting from the laser beam having the first laser beam intensity;
   directing a laser beam having a second laser intensity at the at least one element, the second laser intensity being different than the first laser intensity;
   sampling light reflected from the at least one element, the reflected light resulting from the laser beam having the second laser intensity; and
   determining at least one of a position and a height of the at least one element as a function of the sampled reflected light resulting from the laser beam having the first laser beam intensity and the sampled reflected light resulting from the laser beam having the second laser beam intensity.

2. The method according to claim 1, wherein laser beam intensity is changed from the first laser beam intensity to the second laser beam intensity by varying a drive current to the laser.

3. The method according to claim 1, wherein laser beam intensity is changed from the first laser beam intensity to the second laser beam intensity by an electro-optical arrangement.

4. The method according to claim 1, wherein laser beam intensity is changed from the first laser beam intensity to the second laser beam intensity by an acousto-optical arrangement.

5. The method according to claim 1, wherein the step of directing the laser beam having the first laser beam intensity includes directing the laser beam having the first laser beam intensity to a position other than an apex of the element.

6. The method according to claim 1, wherein the step of directing the laser beam having the second laser intensity includes directing the laser beam having the second laser intensity at an apex of the element.

7. The method according to claim 1, wherein the determining step includes determining the at least one of a position and a height of the at least one element using optical triangulation.

8. The method according to claim 1, wherein the laser intensity is varied by varying an RF drive power to an A-O deflector.

9. The method according to claim 1, wherein the area array device is a ball grid array device, and the elements are solder balls.

10. The method according to claim 1, wherein the area array device is a chip scale package, and the elements are solder balls.

11. The method according to claim 1, wherein the sampling steps are performed by a receiving sensor section.

12. The method according to claim 1, wherein the laser is a semiconductor diode laser.

13. The method according to claim 1, wherein the first laser beam intensity is under 1% of laser full power and the second laser beam intensity is at approximately 100% of the laser full power.

14. The method according to claim 1, further comprising:
   based on the determined at least one of the position and the height, outputting data indicating whether the at least one element passes an inspection.

15. A method of determining a position of at least one element on an area array device, comprising:
   directing a laser beam having a first laser beam intensity at a point on the least one element for a first period;
   sampling light reflected from the at least one element to provide a first sample value, the reflected light resulting from the laser beam having the first laser beam intensity;
   varying the laser beam from the first laser beam intensity to a second laser beam intensity while directing the laser beam at the least one element at the point, the laser beam directed at the at least one element for a second period;
   sampling light reflected from the at least one element to provide a second sample value, the reflected light resulting from the laser beam having the second laser beam intensity; and
   determining at least one of a position and a height of the at least one element as a function of the first sample value and the second sample value.

16. The method according to claim 15, wherein the laser beam intensity is changed from the first laser beam intensity to the second laser beam intensity by varying a drive current to the laser.

17. The method according to claim 15, wherein the laser beam intensity is changed from the first laser intensity to the second laser intensity by an electro-optical arrangement.

18. The method according to claim 15, wherein the laser beam intensity is changed from the first laser intensity to the second laser intensity by an acousto-optical arrangement.

19. The method according to claim 15, wherein the step of determining the at least one of the position and height of the at least one element includes:
   selecting one of the first sample value and the second sample value based on which of the first sample value and the second value has a higher signal to noise ratio; and
   determining the at least one of the position and the height of the element based on the selected sample value, and not the sample value that was not selected in the selecting step.

20. The method according to claim 15, wherein the first period is 0.9 of an entire sample period and the second period is 0.1 of the entire sample period.

21. The method according to claim 15, wherein the area array device is a ball grid array device, and the elements are solder balls.

22. The method according to claim 15, wherein the area array device is a chip scale package, and the elements are solder balls.

23. The method according to claim 15, wherein the laser is a semiconductor diode laser.

24. The method according to claim 15, wherein the first laser intensity is under 1% of laser full power and the second laser intensity is at approximately 100% of laser full power.

25. The method according to claim 15, wherein the laser beam is directed at a second point on the element surface at the first laser beam intensity for another first period;
   sampling reflected laser beam light from the at least one element at the first laser beam intensity while the laser is operating at the first laser beam intensity;
   varying the laser beam from the first laser beam intensity to the second laser beam intensity while directing the laser beam at the least one element at the second point, the laser beam directed at the at least one element for another second period;
sampling reflected laser light directed at the second laser intensity off of the at least one element; and
determining at least one of a second position and a second height of the at least one element at the second point from the sampling of the reflected laser light from the first laser intensity and the sampling of the reflected laser light from the second laser intensity.

26. The method according to claim 15, further comprising:
based on the determined at least one of the position and the height, outputting data indicating whether the at least one element passes an inspection.

27. A method of determining positions and/or heights of elements on an area array device, comprising:
scanning a surface of an area array device with a laser beam;
varying a laser intensity of the laser beam while the laser beam is scanning the surface of the area array device, the laser intensity being alternatingly varied between at least two laser intensity levels;
sampling light reflected from area array device to provide sample values; and
determining at least one of a height and a position of at least some of the elements on the area array device as a function of the sample values.

28. The method according to claim 27, wherein the intensity is varied by varying a laser current.

29. The method according to claim 27, wherein the intensity is varied by varying an RF drive power to an A-O deflector.

30. The method according to claim 27, wherein the area array device is a ball grid array device, and the elements are solder balls.

31. The method according to claim 27, wherein the area array device is a chip scale package.

32. The method according to claim 27, wherein the laser is a semiconductor diode laser.

33. The method according to claim 27, further comprising:
based on the determined at least one of the height and the position, outputting data indicating whether the at least some of the elements pass an inspection.

34. A system for determining a height and/or position of at least one element on an area array device, comprising:
a laser configured to generate a laser beam at a first laser beam intensity and a second laser beam intensity;
a receiving arrangement configured to sample laser light and to receive reflected laser beam light at at least two intensities; and
a controlling device coupled to the laser, the controlling device configured to control laser beam intensity and direct the laser beam at the first laser beam intensity and the second laser beam intensity; and
an arrangement configured to determine at least one of a position and a height of the element as a function of the sampled reflected light resulting from the laser beam having the first laser beam intensity and the second laser beam intensity.

35. The system according to claim 34, wherein the controlling device is a microprocessor.

36. The system according to claim 34, wherein the controlling device is an application specific integrated circuit.

37. The system according to claim 34, wherein the controlling device is a computer.

38. The system according to clam 34, wherein the controlling device is configured to further control at least one of laser position, receiving arrangement position and surface position.

39. The system according to claim 34, wherein the laser is configured to move along a specified path.

40. The system according to claim 34, wherein the receiving arrangement is configured as two separate receiving sections.

41. The system according to claim 34, further comprising:
an acoustic-optical reflector configured to accept the laser beam and deflect the laser beam to the surface.

42. The system according to claim 34, further comprising:
receiving optics configured to focus reflected laser beam light onto the receiving arrangement.

43. The system according to claim 34, wherein the laser is a pulsed semiconductor diode laser.

44. A computer readable medium having stored thereon instructions executable by a computer, the instructions which when executed cause the computer to perform a method, the method comprising:
directing a laser beam having a first laser beam having a first laser beam intensity at the surface of the at least one element;
sampling light reflected from at least one element, the reflected light resulting from the laser beam having the first laser beam intensity;
directing a laser beam having a second laser intensity at the at least one element, the second laser intensity being different than the first laser intensity;
sampling light reflected from the at least one element, the reflected light resulting from the laser beam having the second laser intensity; and
determining at least one of the position and the height of the at least one element as a function of the sampled reflected light resulting from the laser beam having the first laser intensity and the sampled reflected light resulting from the laser beam having the second laser beam intensity.

45. The computer readable medium according to claim 44, wherein the method further comprises:
based on the determined at least one of the position and the height, outputting data indicating whether the at least one element passes an inspection.

46. The method according to claim 1, wherein the step of sampling light reflected from the at least one element, the reflected light resulting from the laser beam having the first laser beam intensity occurs as the laser beam moves across the surface of the element and the step of sampling light reflected from the at least one element, the reflected light resulting from the laser beam having the second laser intensity occurs as the laser beam moves across the surface of the element.

47. A computer readable medium having stored thereon instructions executable by a computer, the instructions which when executed cause the computer to perform a method, the method comprising:
directing a laser beam having a first laser beam intensity at a point on the least one element for a first period;
sampling light reflected from the at least one element to provide a first sample value, the reflected light resulting from the laser beam having the first laser beam intensity;
varying the laser beam from the first laser beam intensity to a second laser beam intensity while directing the laser beam at the point, the laser beam directed at the at least one element for a second period;

sampling light reflected from the at least one element to provide a second sample value, the reflected light resulting from the laser beam having the second laser beam intensity; and determining at least one of a position and a height of the at least one element as a function of the first sample value and the second sample value.

48. The computer readable medium according to claim 47, wherein the method further comprises:

based on the determined at least one of the position and the height, outputting data indicating whether the at least one element passes an inspection.

49. A computer readable medium having stored thereon instructions executable by a computer, the instructions which when executed cause the computer to perform a method, the method comprising:

scanning a surface of an area array device with a laser beam;

varying a laser intensity of the laser beam while the laser beam is scanning the surface of the area array device, the laser intensity being alternatingly varied between at least two laser intensity levels;

sampling light reflected from area array device to provide sample values; and determining at least one of a height and a position of at least some of the elements on the area array device as a function of the sample values.

50. The computer readable medium according to claim 49, wherein the method further comprises:

based on the determined at least one of the height and the position, outputting data indicating whether the at least some of the elements pass an inspection.

51. A method of determining a height and/or position of at least one element on an area array device, comprising:

directing a laser beam having a first laser beam intensity at the surface of the at least one element;

sampling light reflected from the at least one element, the reflected light resulting from the laser beam having the first laser beam intensity;

directing a laser beam having a second laser intensity at the at least one element, the second laser intensity being different than the first laser intensity;

sampling light reflected from the at least one element, the reflected light resulting from the laser beam having the second laser intensity; and outputting data reflecting a determination of at least one of a position and a height of the at least one element as a function of the sampled reflected light resulting from the laser beam having the first laser beam intensity and the sampled reflected light resulting from the laser beam having the second laser beam intensity.

52. The method according to claim 51, further comprising:

processing the outputted data for repositioning the at least one element.

* * * * *